No. 739,138. PATENTED SEPT. 15, 1903.
C. E. BAKER & A. W. BURWELL.
PROCESS OF TREATING TELLURID ORES OF GOLD AND SILVER.
APPLICATION FILED NOV. 11, 1902.
NO MODEL.
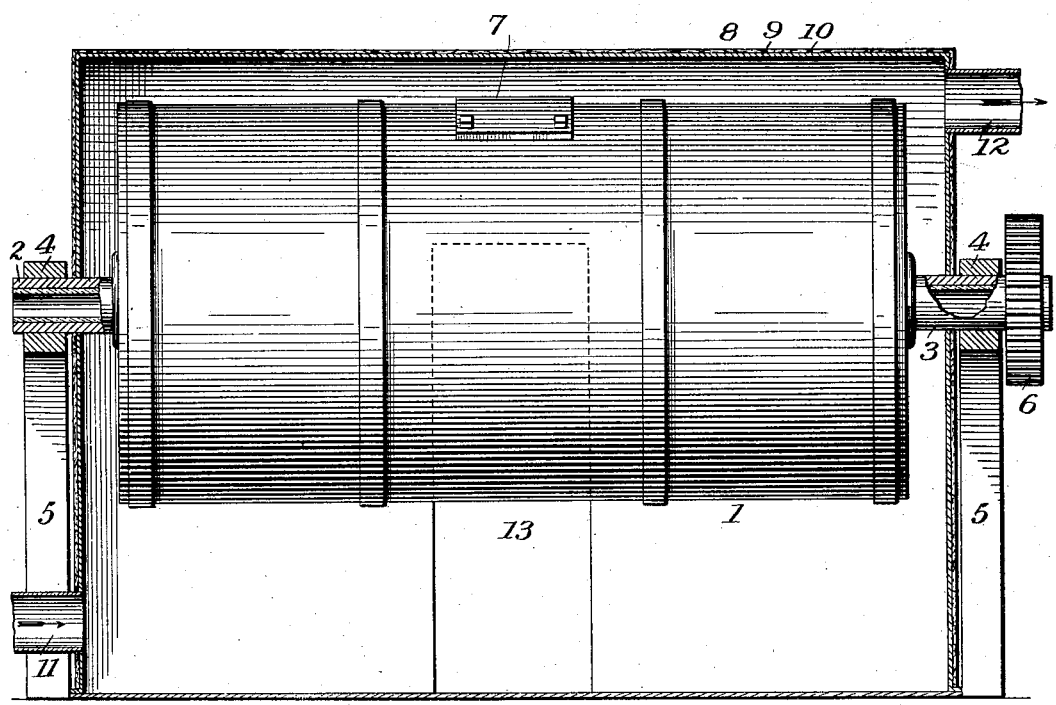
Witnesses:
R A Balderson.
W. E. Neff.
Inventors
Charles E. Baker,
Arthur W. Burwell,
By Bynues & Townsend.
Att'ys.

No. 739,138. Patented September 15, 1903.

UNITED STATES PATENT OFFICE.

CHARLES E. BAKER AND ARTHUR W. BURWELL, OF CLEVELAND, OHIO.

PROCESS OF TREATING TELLURID ORES OF GOLD AND SILVER.

SPECIFICATION forming part of Letters Patent No. 739,138, dated September 15, 1903.

Application filed November 11, 1902. Serial No. 130,844. (No specimens.)

*To all whom it may concern:*

Be it known that we, CHARLES E. BAKER and ARTHUR W. BURWELL, citizens of the United States, residing at Cleveland, in the county of Cuyahoga and State of Ohio, have invented certain new and useful Improvements in Processes of Treating Tellurid Ores of Gold and Silver, of which the following is a specification.

This process is especially intended for the recovery of gold and silver from their tellurid ores. These ores generally contain base metals—such as iron, copper, zinc, or lead—but not in paying quantities.

The process, generally stated, consists in treating raw crushed ore or concentrates with chlorin while subjected to a temperature sufficient to cause the chlorin to combine with the tellurium to produce a soluble chlorid. The base metals present also combine with chlorin to form soluble protochlorids. The gold is liberated in a free state and the silver is converted into a chlorid. To obtain the best results, both the ore and chlorin should be dry and the ore should be agitated to increase the speed of the reaction. Water is then added to the mass, whereby the base-metal chlorids are brought into solution, while the free gold and silver chlorid remain with the gangue and may be separately recovered.

The process may be carried out by the use of any suitable apparatus. One which has been employed is shown in the accompanying drawing, in which—

The figure is a vertical longitudinal section showing the ore-drum in elevation.

The apparatus shown comprises a revolving drum 1, preferably of boiler-iron lined with porcelain. This drum has hollow trunnions 2 3, also lined with porcelain, which are supported in journal-boxes 4, carried by standards 5. A gear-wheel 6 for rotating the drum is secured on trunnion 3. The drum has a suitable opening 7 for receiving and discharging its contents. Surrounding the drum is a chamber 8, which may be of boiler-iron 9 with a covering 10 of asbestos. A flue 11 opens into chamber 8 at one end and near its base, serving for the introduction of heating-gases. A flue 12 for discharging the waste gases leads from the other end of the chamber near its top. A door 13 in one side of the chamber gives access to the drum for the purpose of charging and discharging it.

For the sake of illustration the process will be described as carried out on a tellurid ore containing gold, silver, and iron. The ore is crushed to about fifty mesh, and a sufficient amount is placed in the drum to one-third fill it. The drum is now set in rotation and its contents heated to about 150° centigrade preferably by waste products of combustion introduced through flue 11. Dry chlorin gas is then introduced through trunnion 2 and combines with the tellurium or the greater part thereof to form a soluble chlorid. The iron or other base metal in the ore is thus converted into a protochlorid, and care must be taken to discontinue the introduction of chlorin gas at the precise moment when all of the tellurium has been removed, which can be determined by the fact that chlorin only then escapes through trunnion 3. This is necessary to prevent conversion of the ferrous chlorid into the more volatile ferric chlorid, which might be driven off by the heat applied to the drum. The mass is now treated with water, either in the drum or in a separate vessel, whereby the iron or other base-metal chlorid and the tellurium chlorid are brought into solution, while the free gold and the silver chlorid remain with the gangue. The gold and silver may be recovered by amalgamation. A small amount of acid, preferably dilute sulfuric acid, must be used in amalgamation to prevent flouring of the mercury—a result which seems to be due to the presence of tellurium compounds in the solution. The pulp is preferably heated during the amalgamation, as by the use of steam. If any gold goes into solution as chlorid, it may be recovered by electrolysis, using a voltage insufficient to decompose the base-metal chlorid. The base-metal chlorid solution is preferably electrolyzed with insoluble anodes to give chlorin for use in the process and the metal. When iron is thus recovered, it may be briqueted and melted down.

We claim—

1. The process of treating ores of gold and silver containing a base metal and tellurium, which consists of combining the base metal and tellurium with chlorin, and separating the base-metal chlorid from the other metals or metallic compounds in the mass, as set forth.

2. The process of treating ores of gold and silver containing a base metal and tellurium, which consists of combining the base metal and tellurium with chlorin by bringing chlorin into contact with the ore while hot, and separating the base-metal chlorid from the other metals or metallic compounds in the mass, as set forth.

3. The process of treating ores of gold and silver containing a base metal and tellurium, which consists of combining the base metal and tellurium with chlorin by bringing dry chlorin into contact with the dry ore while hot, and separating the base-metal chlorid from the other metals or metallic compounds in the mass, as set forth.

4. The process of treating ores of gold and silver containing a base metal and tellurium, which consists of combining the base metal and tellurium with chlorin, and dissolving and removing the base-metal and tellurium chlorids from the mass, as set forth.

5. The process of treating ores of gold and silver containing a base metal and tellurium, which consists of combining the base metal and tellurium with chlorin, dissolving and removing the base-metal and tellurium chlorids from the mass, and electrolyzing the base-metal chlorid to obtain the base metal and free chlorin, as set forth.

6. The process of treating ores of gold and silver containing a base metal and tellurium, which consists of combining the base metal, silver and tellurium with chlorin, dissolving and removing the base-metal and tellurium chlorids from the mass, and recovering the gold and silver, as set forth.

In testimony whereof we affix our signatures in presence of two witnesses.

CHARLES E. BAKER.
ARTHUR W. BURWELL.

Witnesses:
A. C. BOWEN,
S. E. STONE.